US012190773B2

(12) United States Patent
Hai

(10) Patent No.: US 12,190,773 B2
(45) Date of Patent: Jan. 7, 2025

(54) SETTING METHOD OF DISPLAY PANEL AND DISPLAY PANEL

(71) Applicant: TCL CHINA STAR OPTOELECTRONICS TECHNOLOGY CO., LTD., Guangdong (CN)

(72) Inventor: Bo Hai, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 649 days.

(21) Appl. No.: 16/973,262

(22) PCT Filed: Oct. 23, 2020

(86) PCT No.: PCT/CN2020/123145
§ 371 (c)(1),
(2) Date: Dec. 8, 2020

(87) PCT Pub. No.: WO2022/047920
PCT Pub. Date: Mar. 10, 2022

(65) Prior Publication Data

US 2023/0132902 A1 May 4, 2023

(30) Foreign Application Priority Data

Sep. 2, 2020 (CN) ......................... 202010908259.1

(51) Int. Cl.
*G09G 5/10* (2006.01)
*G09G 3/20* (2006.01)

(52) U.S. Cl.
CPC ... *G09G 3/2007* (2013.01); *G09G 2320/0276* (2013.01); *G09G 2320/0626* (2013.01); *G09G 2320/0666* (2013.01); *G09G 2360/16* (2013.01)

(58) Field of Classification Search
CPC ......... G09G 3/2007; G09G 2320/0626; G09G 2320/0666; G09G 2360/16
(Continued)

(56) References Cited

U.S. PATENT DOCUMENTS 6,844,881 B1 1/2005 Chen et al.
2008/0309766 A1 12/2008 Lin
(Continued)

FOREIGN PATENT DOCUMENTS

CN 101447161 A 6/2009
CN 101976540 A 2/2011
(Continued)

*Primary Examiner* — Jennifer T Nguyen

(57) ABSTRACT

The present disclosure provides a setting method of a display panel and the display panel, the method includes: acquiring a first chromaticity information of a first gray scale and a second chromaticity information of a second gray scale; acquiring a first difference value between the first chromaticity information and the second chromaticity information; and adjusting gray scale voltages of the first gray scale and/or the second gray scale when the first difference value is greater than a preset difference threshold, and a second difference value between the first chromaticity information and the second chromaticity information after adjustment is less than the first difference value.

20 Claims, 6 Drawing Sheets

(58) Field of Classification Search
USPC .......................................................... 345/691
See application file for complete search history.

(56) References Cited

U.S. PATENT DOCUMENTS

| | | | | |
|---|---|---|---|---|
| 2011/0134160 | A1* | 6/2011 | Okishiro | H04N 9/69 345/690 |
| 2017/0278448 | A1* | 9/2017 | Zhang | G09G 3/2074 |
| 2018/0033380 | A1 | 2/2018 | An | |
| 2022/0223090 | A1* | 7/2022 | Kim | G09G 5/02 |

FOREIGN PATENT DOCUMENTS

| | | | | | |
|---|---|---|---|---|---|
| CN | 104751756 | A | | 7/2015 | |
| CN | 105185286 | A | | 12/2015 | |
| CN | 105304062 | A | | 2/2016 | |
| CN | 106023942 | A | | 10/2016 | |
| CN | 106782303 | | * | 5/2017 | G09G 3/3208 |
| CN | 106782303 | A | | 5/2017 | |
| CN | 109166555 | A | | 1/2019 | |
| CN | 109493830 | A | | 3/2019 | |

* cited by examiner

SETTING METHOD OF DISPLAY PANEL AND DISPLAY PANEL

FIELD OF INVENTION

The present disclosure relates to the field of electronic apparatus technology, in particular to a setting method of a display panel and the display panel.

BACKGROUND OF INVENTION

Because of differences of each display panel, a display panel must undergo gamma correction before leaving a factory so as to make a gray scale brightness curve outputted be consistent with human eye perception, that is, conform to a gamma index curve. Generally, an adjustable gamma curve is set to 2.2. However, in the related art, chromatic aberration between gray scales of the display panel after gamma correction is still serious.

SUMMARY OF INVENTION

An embodiment of the present disclosure provides a setting method of a display panel and the display panel, which can reduce chromatic aberration between gray scales of the display panel.

In a first aspect, an embodiment of the present disclosure provides a setting method of a display panel, comprising:

Acquiring a first chromaticity information of a first gray scale and a second chromaticity information of a second gray scale, wherein the first gray scale and the second gray scale are set at intervals;

Acquiring a first difference value between the first chromaticity information and the second chromaticity information; and Adjusting gray scale voltages of the first gray scale and/or the second gray scale when the first difference value is greater than a preset difference threshold, in order to adjust the first chromaticity information and/or the second chromaticity information, and a second difference value between the first chromaticity information and the second chromaticity information after adjustment is less than the first difference value.

In a second aspect, an embodiment of the present disclosure further provides a setting method of a display panel, comprising:

Acquiring a plurality of chromaticity information of a plurality of gray scales set at intervals; and Adjusting a gray scale voltage of at least one of the gray scales if a difference value of the chromaticity information of any two of the gray scales is greater than a preset difference threshold, such that difference value between the chromaticity information of any two of the gray scales is not greater than the preset difference threshold.

In a third aspect, an embodiment of the present disclosure further provides a setting method of a display panel, comprising:

Acquiring a plurality of chromaticity information of a plurality of gray scales set at intervals;

Obtaining an average chromaticity information according to the plurality of chromaticity information; and Adjusting a gray scale voltage of at least one of the gray scales if a difference value between chromaticity information of any of the gray scales and the average chromaticity information is greater than a preset difference threshold, so that the difference value between the chromaticity information of any of the gray scales after adjustment and the average chromaticity information is not greater than the preset difference threshold.

In a fourth aspect, an embodiment of the present disclosure further provides a display panel comprising a memory and a processor, and the processor is configured to execute the above method through calling computer programs stored in the memory.

DESCRIPTION OF DRAWINGS

The following detailed description of specific embodiments of the present disclosure in conjunction with the accompanying drawings will make technical solutions and beneficial effects of the present disclosure obvious.

DETAILED DESCRIPTION OF PREFERRED EMBODIMENTS

Technical solutions in embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work are within the protection scope of the present disclosure.

It can be understood that, the execution subject in an embodiment of the present disclosure may be a display panel.

Figure 1:
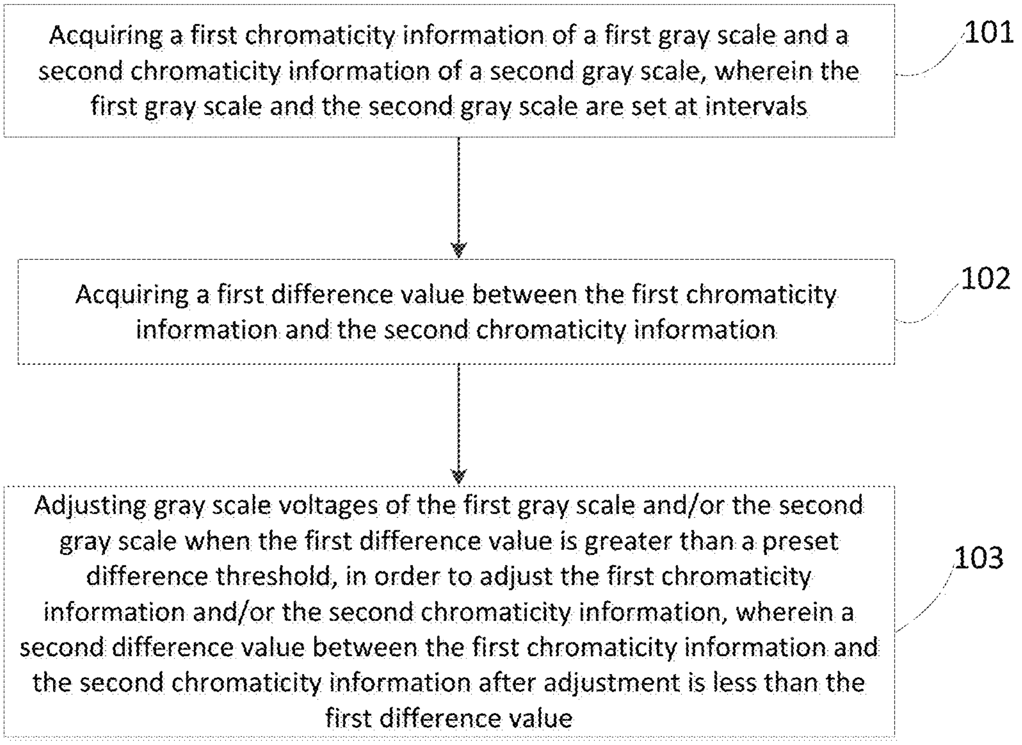
FIG. 1 is a schematic flowchart of a first setting method of a display panel provided in an embodiment of the present disclosure.

A setting method of a display panel is provided in an embodiment of the present disclosure. Please refer to FIG. 1 for details, FIG. 1 is a schematic flowchart of a first setting method of a display panel provided in the embodiment of the present disclosure. The setting method of the display panel comprises:

101, a first chromaticity information of a first gray scale and a second chromaticity information of a second gray scale are acquired, and the first gray scale and the second gray scale are set at intervals.

The first gray scale and the second gray scale are set at intervals. For example, the display panel comprises 256 gray scales, the first gray level may be 31st gray scale, and the second gray level may be 127th gray scale. It can be understood that, the first gray scale and the second gray scale may be set to other gray scales as needed.

102, a first difference value between the first chromaticity information and the second chromaticity information is acquired.

After the first chromaticity information of the first gray scale and the second chromaticity information of the second gray scale are acquired, the first difference value between the first chromaticity information and the second chromaticity information is calculated.

103, when the first difference value is greater than a preset difference threshold, gray scale voltages of the first gray scale and/or the second gray scale are adjusted to adjust the first chromaticity information and/or the second chromaticity information, and a second difference value between the first chromaticity information and the first chromaticity information after adjustment is less than the first difference value.

In the display field, different proportions of the three primary colors of R, G, and B can match various light colors in visible light. The International Commission on Illumination (CIE) stipulates that wavelengths of the three primary colors of R, G, and B are 700 nm, 546.1 nm, 435.8 nm, respectively. In the color matching experiment, the white light can be matched when the relative brightness ratio of the three primary colors is 1.0000:4.5907:0.0601.

The wavelength is spread over the visible light range to obtain the change of the stimulus value according to the wavelength, which is called the spectral tristimulus value. Each wavelength of the spectrum is matched with the number of the three primary colors of red, green, and blue corresponding to the iso-energy spectrum color, which is called the CIE-RGB spectrum tristimulus value, and recorded as X, Y, and Z.

Figure 2:
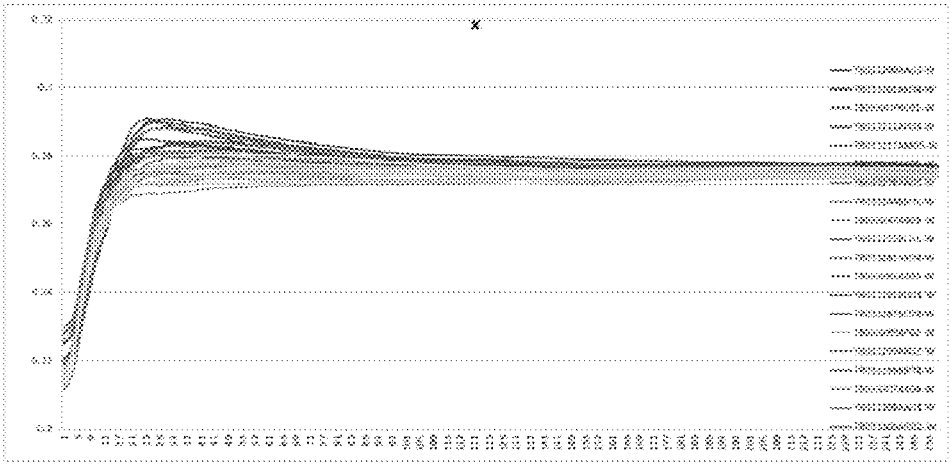
FIG. 2 is a schematic diagram of chromaticity curves of chromaticity x between different gray scales of a plurality of display panels provided in an embodiment of the present disclosure.
Figure 3:
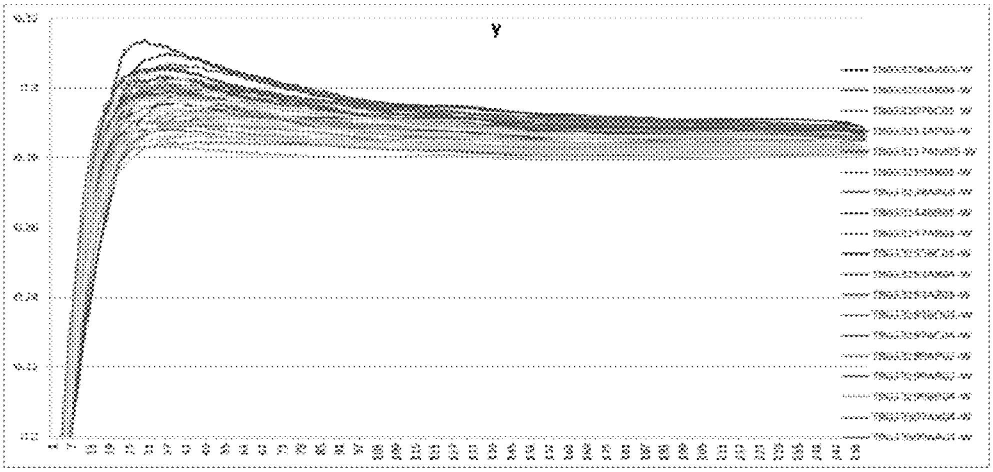
FIG. 3 is a schematic diagram of chromaticity curves of chromaticity y between different gray scales of a plurality of display panels provided in an embodiment of the present disclosure.

In the related art, chromatic aberration between different gray scales of the display panel is serious. For example, please refer to FIG. 2 and FIG. 3. FIG. 2 shows chromaticity curves of the chromaticity x between different gray scales, and FIG. 3 shows chromaticity curves of the chromaticity y in different gray scales. As shown in the diagrams, the chromaticity curves of the chromaticity x and the chromaticity curves of the chromaticity y are not smooth, differences between different panels are huge, and the chromaticity curves of chromaticity x or the chromaticity curves of chromaticity y corresponding to some panels are severely warped. Wherein, each display panel has different degrees of chromatic aberration between different gray scales.

The chromaticity information xy of each gray scale is calculated from the tristimulus value XYZ corresponding to each gray scale, and the x or y of each gray scale is different, that is, the XYZ of each gray scale is different. The calculation formulas of the chromaticity information xy and the tristimulus value XYZ are as follows:

$$x = \frac{X}{X - Y + Z};$$

$$y = \frac{Y}{X - Y + Z}.$$

W is the common display of RGB, and WXYZ is obtained by summing the XYZ of RGB. Wx or Wy of each gray scale is different, that is, RGB XYZ of each gray scale is different. The calculation formulas of XYZ of Wx and Wy and XYZ of RGB are as follows:

$$x_{(w)} = \frac{X_{(R+G+B)}}{X_{(R+G+B)} + Y_{(R+G+B)} + Z_{(R+G+B)}};$$

$$y_{(w)} = \frac{Y_{(R+G+B)}}{X_{(R+G+B)} + Y_{(R+G+B)} + Z_{(R+G+B)}}.$$

Figure 4:
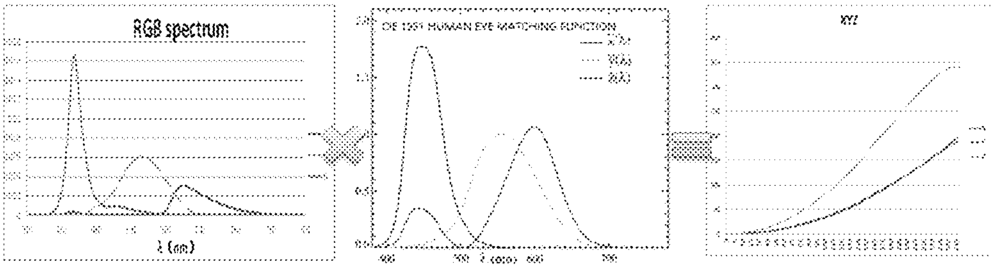
FIG. 4 is a schematic diagram of relationship between a RGB spectrum, a human eye matching function, and a tristimulus value XYZ provided in an embodiment of the present disclosure.

Please refer to FIG. 4, the first diagram in the figure is RGB spectrum of the display panel, the second diagram is human eye matching function, and the third diagram is the tristimulus value XYZ. The XYZ of each gray scale of RGB is determined by the RGB penetration spectrum of each gray scale.

$$X=k\int_{\lambda}S(\lambda)\cdot\rho(\lambda)\cdot\bar{x}(\lambda)d\lambda;$$

$$Y=k\int_{\lambda}S(\lambda)\cdot\rho(\lambda)\cdot\bar{y}(\lambda)d\lambda;$$

$$Z=k\int_{\lambda}S(\lambda)\cdot\rho(\lambda)\cdot\bar{z}(\lambda)d\lambda;$$

Among them, K is the photopic 683, S(λ) is the BLU spectrum, p(A) is the penetration spectrum of the display panel, and $\bar{x}$, $\bar{y}$, $\bar{z}$ are CIE1931 standard chromaticity observer color matching.

The gamma curve is a special tone curve. When the gamma value is equal to 1, the curve is a straight line at 45° with the coordinate axis, which means the input and output density are the same. The gamma value higher than 1 will cause the output to darken, and the gamma value lower than 1 will cause the output to brighten. The display panel must be gamma corrected when leaving the factory to ensure the output gray scale brightness curve consistent with human eye perception, that is, conform to the gamma index curve.

Figure 5:
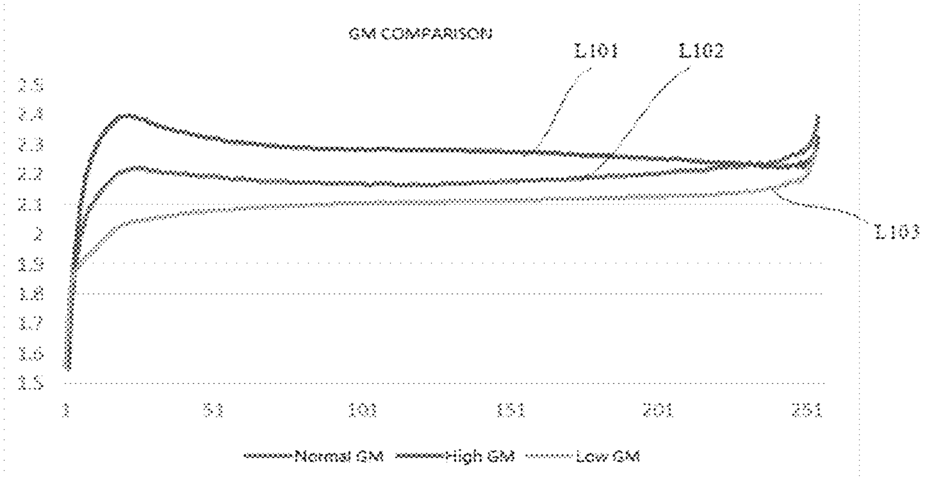
FIG. 5 is a corresponding schematic diagram of the gray scales and the Gramma provided in the embodiment of the present disclosure.
Figure 6:
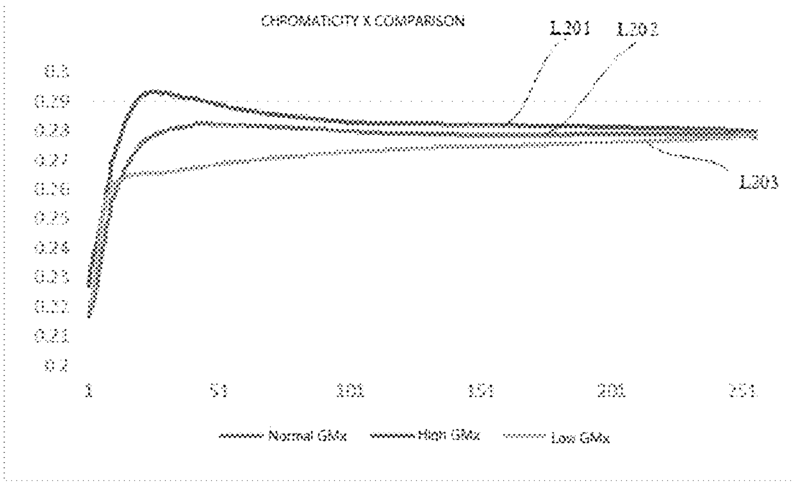
FIG. 6 is a corresponding schematic diagram of the gray scales and the chromaticity x provided in the embodiment of the present disclosure.
Figure 7:
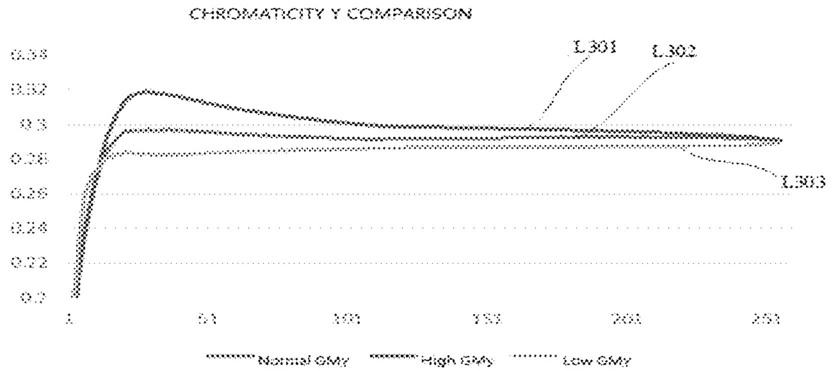
FIG. 7 is a corresponding schematic diagram of the gray scales and the chromaticity y provided in the embodiment of the present disclosure.

The gamma value is determined by different gray scales (V) and brightness (T), that is, determined by VT. The gray scale (V) can be considered as a gray scale voltage corresponding to the gray scale, and the brightness (T) can be considered as the transmission spectrum corresponding to the gray scale. The chromaticity xy is determined by RGB VT. RGB can be considered as the frequency spectrum corresponding to each gray scale. The gamma value and the chromaticity xy are both determined by VT, and both will change together with the change of VT, so that the gamma value is the main factor reflecting the chromatic aberration between gray scales, and the gamma value between different gray scales (that is the local gamma value) reflects the grayscale chromaticity of each gray scale. The local gamma curve of each gray scale also reflects the chromaticity curve of each gray scale, and reflects the chromatic aberration between gray scales. Please refer to FIGS. 5 to 7 for details. In FIG. 5, L101 is a curve corresponding to a higher gamma value, L102 is a curve corresponding to a normal gamma value, and L103 is a curve corresponding to a lower gamma value. In FIG. 6, L201 is a curve corresponding to a higher chromaticity x, L202 is a curve corresponding to a normal chromaticity x, and L203 is a curve corresponding to a lower chromaticity x. In FIG. 7, L301 is a curve corresponding to a higher chromaticity y, L302 is a curve corresponding to a normal chromaticity y, and L303 is a curve corresponding to a lower chromaticity y.

Difference of the display panel RGB VT leads to the RGB XYZ difference of each gray scale, the RGB XYZ difference of each gray scale leads to the W XYZ difference of each gray scale, and the W XYZ difference of each gray scale leads to the Wxy difference of each gray scale. Therefore, the chromatic aberration between gray scales (Wxy difference of each gray scale) is mainly decided by RGB VT. Without changing the manufacturing process of the display panel, the main factor reflecting the chromatic aberration between the gray scales, namely the gamma value, is found.

Figure 8:
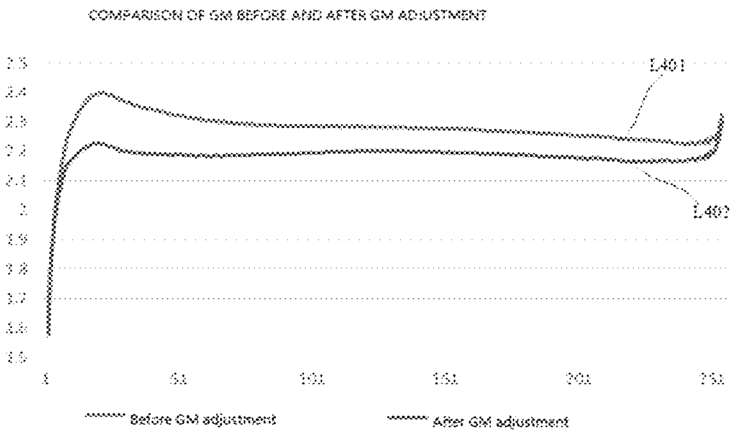
FIG. 8 is a schematic diagram of comparison between the Gramma before and after adjustment provided in the embodiment of the present disclosure.
Figure 9:
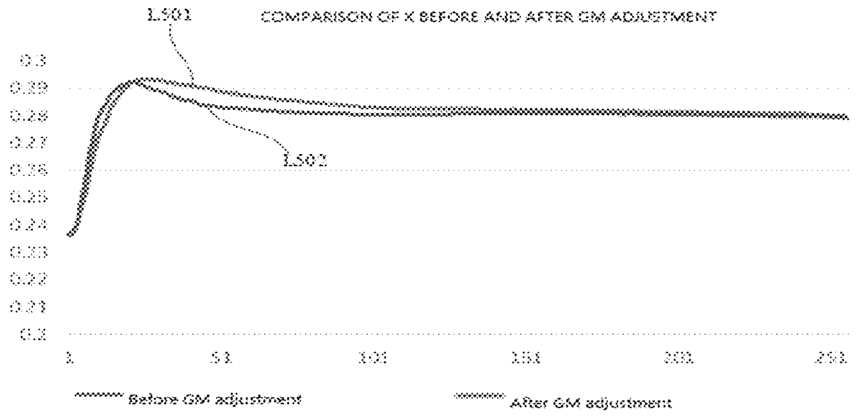
FIG. 9 is a schematic diagram of comparison between the chromaticity x before and after adjustment provided in the embodiment of the present disclosure.
Figure 10:
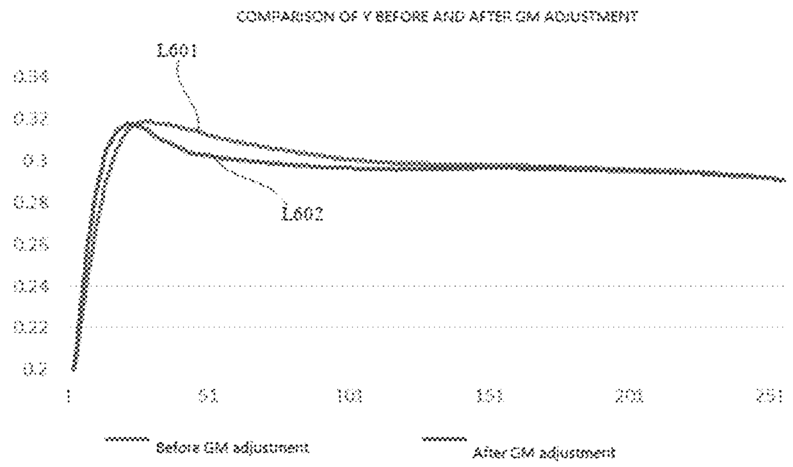
FIG. 10 is a schematic diagram of comparison between the chromaticity y before and after adjustment provided in the embodiment of the present disclosure.
Figure 11:
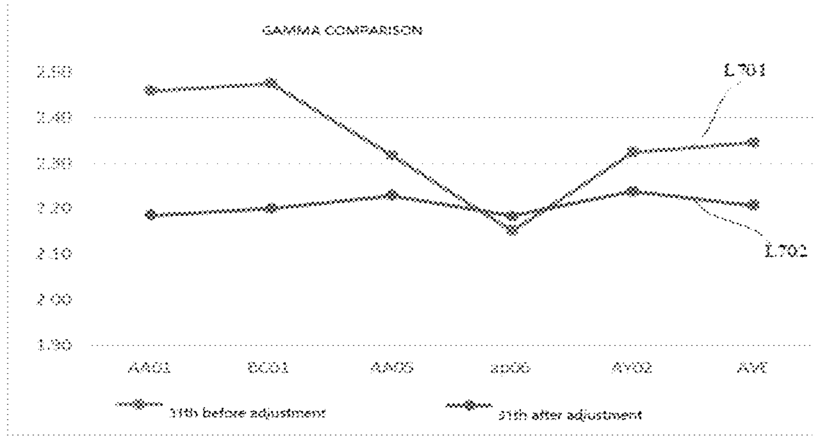
FIG. 11 is a schematic diagram of comparison between the gamma of the plurality of display panels before and after adjustment provided in the embodiment of the present disclosure.
Figure 12:
FIG. 12 is a schematic diagram of comparison between differences of the chromaticity x of the plurality of display panels before and after adjustment provided in the embodiment of the present disclosure.
Figure 13:
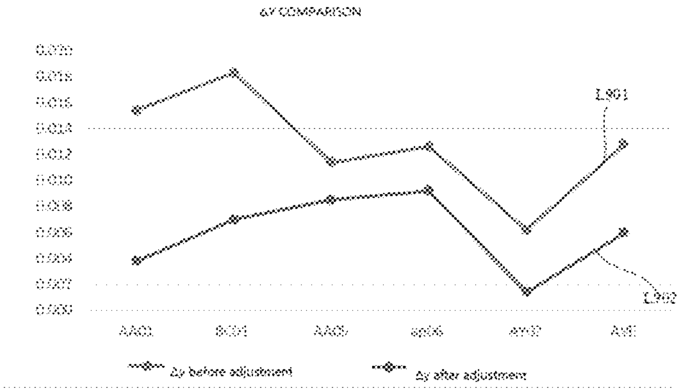
FIG. 13 is a schematic diagram of comparison between differences of the chromaticity y of the plurality of display panels before and after adjustments provided in the embodiment of the present disclosure.

Therefore, if the first difference value is greater than the preset difference threshold, it means that the chromatic aberration between the first gray scale and the second gray scale is large, that is, color difference between different gray scales of the display panel is relatively large, which needs to be adjusted. Specifically, gray scale voltages of the first gray scale and/or the second gray scale are adjusted to adjust chromaticity information of the first gray scale and/or the second gray scale, therefore a second difference value between the first gray scale and the second gray scale after adjustment is less than the first difference value, which decreases the chromatic aberration between different gray scales of the display panel. There is no need to adjust a lot of data, just adjust the corresponding gray scale voltage, and the smallest amount of data need to be adjusted to reduce the chromatic aberration of different gray scales. Please refer to FIGS. 8 to 13 for details. In FIG. 8, L401 is a gamma curve before adjustment, and L402 is a gamma curve after adjustment. In FIG. 9, L501 is a curve of chromaticity x of each gray scale before adjustment, and L502 is a curve of chromaticity x of each gray scale after adjustment. In FIG. 10, L601 is a curve of the chromaticity y of each gray scale before adjustment, and L602 is a curve of the chromaticity y of each gray scale after adjustment. In FIG. 11, L701 is a gamma curve of a plurality of display panels before adjustment, and L702 is a gamma curve of a plurality of display panels after adjustment. In FIG. 12, L801 is a curve of the difference of the chromaticity x of the plurality of display panels before adjustment, and L802 is a curve of the difference of the chromaticity x of the plurality of display panels after adjustment. In FIG. 13, L901 is a curve of the difference of the chromaticity y of the plurality of display panels before adjustment, and L902 is a curve of the difference of the chromaticity y of the plurality of display panels after adjustment.

It can be understood that, adjusting gray scale voltages means adjusting the gamma value of corresponding gray scales.

If the first difference value is not greater than the preset difference threshold, it means that the chromatic aberration between the first gray scale and the second gray scale is relatively small, and no adjustment or only simple adjustment is needed, such as the chromaticity information of the first gray scale and/or the second gray scale is adjusted so that the chromatic aberration between the first gray scale and the second gray scale is less.

Wherein, the brightness of the first gray scale is lower the brightness of the second gray scale. That is, the first gray scale is low gray scale, and the second gray scale is a high gray scale. For example, the display panel comprises 256 gray scales, the first gray scale may be the 31st gray scale, and the second gray scale is the 127th gray scale. Obviously, in other embodiments, the numbers of gray scale corresponding to the first gray scale and the second gray scale may be adjusted as needed. For example, the display panel comprises 256 gray scales, the first gray scale may be the 127th gray scale, and the second gray scale is the 21st gray scale.

In some embodiments, adjusting the first gray scale and/or the second gray scale may comprise:

When the first chromaticity information is greater than the second chromaticity information, the gray scale voltage of the first gray scale is reduced to reduce the first chromaticity information.

When the first chromaticity information is greater than the second chromaticity information, that is, when the chromaticity information of the first gray scale is higher than the chromaticity information of the second gray scale (for example, the chromaticity value of the chromaticity information of the first gray scale minus the chromaticity value of the chromaticity information of the second gray scale is greater than 0), the gray scale voltage of the first gray scale may be reduced to reduce the first chromaticity information. The gray scale voltage of the first gray scale is lowered, that is, the brightness becomes higher, where B becomes higher than RG, and the chromaticity information xy of the first gray scale will decrease, thereby reducing the difference with the chromaticity information of the second gray scale value, even if the chromatic aberration between the first gray scale and the second gray scale is relatively small.

In some embodiments, adjusting the first gray scale and/or the second gray scale may further comprise:

When the first chromaticity information is less than the second chromaticity information, the gray scale voltage of the first gray scale is increased to increase the first chromaticity information.

When the first chromaticity information is less than the second chromaticity information, that is, when the chromaticity information of the first gray scale is lower than the chromaticity information of the second gray scale (for example, the chromaticity value of the chromaticity information of the first gray scale minus the chromaticity value of the chromaticity information of the second gray scale is less than 0), the gray scale value of the first gray scale may be increased to increase the first chromaticity information. The gray scale voltage of the first gray scale is adjusted higher, that is, the brightness becomes lower, where B becomes lower than RG, and the chromaticity information xy of the first gray scale will increase, thereby reducing the difference with the chromaticity information of the second gray scale, even if the chromatic aberration between the first gray scale and the second gray scale is less.

In some embodiments, adjusting the first gray scale and/or the second gray scale may further comprise:

When the first chromaticity information is greater than the second chromaticity information, the gray scale voltage of the second gray scale is increased to increase the second chromaticity information.

When the first chromaticity information is greater than the second chromaticity information, that is, when the chromaticity information of the first gray scale is higher than the chromaticity information of the second gray scale (for example, the chromaticity value of the chromaticity information of the first gray scale minus the chromaticity value of the chromaticity information of the second gray scale is greater than 0) the gray scale voltage of the second gray scale is increased to increase the second chromaticity information. The gray scale voltage of the second gray scale is adjusted higher, and the chromaticity information xy of the second gray scale will increase, thereby reducing the difference with the chromaticity information of the first gray scale, even if the chromatic aberration of the first gray scale and the second gray scale is less.

In some embodiments, adjusting the gray scale voltages of the first gray scale and/or the second gray scale may further comprise:

When the first chromaticity information is less than the second chromaticity information, the gray scale voltage of the second gray scale is reduced to reduce the second chromaticity information.

When the first chromaticity information is less than the second chromaticity information, that is, the chromaticity information of the first gray scale is lower than the chromaticity information of the second gray scale (for example the chromaticity value of the chromaticity information of the first gray scale minus the chromaticity value of the chromaticity information of the second gray scale is less than 0), the gray scale voltage of the second gray scale is reduced to reduce the second chromaticity information. The gray scale voltage of the second gray scale is adjusted lower and the chromaticity information xy of the second gray scale will reduce, thereby reducing the difference with the chromaticity information of the first gray scale, even if the chromatic aberration of the first gray scale and the second gray scale is less.

In some embodiments, adjusting the gray scale voltages of the first gray scale and/or the second gray scale may further comprise:

If the gray scale voltage of the first gray scale is adjusted, then the gray scale voltages of gray scales adjacent to the first gray scale are adjusted simultaneously;

When the gray scale voltage of the first gray scale is adjusted, the gray scale voltages of the gray scales adjacent to the first gray scale are adjusted simultaneously, therefore the gray scale voltages corresponding to a section of the gamma curve are changed accordingly. Wherein, the gray scale voltages of other gray scales adjacent to the first gray scale may be same as or different from the gray scale voltage of the first gray scale. For example, according to the gray scale voltage of the first gray scale and the preset calculation relationship, the gray scale voltages corresponding to other gray scales adjacent to the first gray scale is calculated, and the gray scale voltage of each gray scale may be different, or may be partly same.

If the gray scale voltage of the second gray scale is adjusted, then the gray scale voltages of the gray scales adjacent to the second gray scale is adjusted simultaneously.

When the gray scale voltage of the second gray scale is adjusted, the gray scale voltages of the gray scales adjacent to the second gray scale are adjusted simultaneously, therefore the gray scale voltages corresponding to a section of the gamma curve is changed accordingly. Wherein, the gray scale voltages of other gray scales adjacent to the second gray scale may be same as or different from the gray scale voltage of the second gray scale. For example, according to the gray scale voltage of the second gray scale and the preset calculation relationship, the gray scale voltages corresponding to other gray scales adjacent to the second gray scale can be calculated, and the gray scale voltage of each gray scale may be different, or partly the same.

In some embodiments, adjusting the gray scale voltages of the first gray scale and/or the second gray scale may further comprise:

If the gray scale voltages of the first gray scale and the second gray scale are adjusted, then the gray scale voltages of the gray scales between the first gray scale and the second gray scale are adjusted simultaneously.

The gray scale voltages of the first gray scale and the second gray scale are both adjusted, the gray scale voltages of gray scales between the first gray scale and the second gray scale also need to be adjusted accordingly, thereby the chromatic aberration of the first gray scale, the second gray scale and all the gray scales between the first gray scale and the second gray scale are all very small.

In some embodiments, adjusting the gray scale voltages of the first gray scale and/or the second gray scale may further comprise:

Acquiring a first gamma value of the first gray scale and a second gamma value of the second gray scale;

Acquiring a first gamma difference value between the first gamma value and the preset reference gamma value, and a second gamma difference value between the second gamma value and the preset reference gamma value;

If the first gamma difference value is greater than the preset gamma threshold, and the second gamma difference value is greater than the preset gamma threshold, then the gray scale voltages of the first gray scale and the second gray scale are adjusted;

If the first gamma difference value is greater than the preset gamma threshold, and the second gamma difference value is not greater than the preset gamma threshold, then the gray scale voltage of the first gray scale is adjusted;

If the first gamma difference value is not greater than the preset gamma threshold, and the second gamma difference value is greater than the preset gamma threshold, then the gray scale voltage of the second gray scale is adjusted.

A preset reference gamma value may be preset, and the first gamma value of the first gray scale and the second gamma value of the second gray scale are compared with the preset reference gamma value respectively, if the first gamma difference value is greater than the preset gamma threshold and the second gamma difference value is greater than the preset gamma threshold, the gray scale voltages of the first gray scale and the second gray scale are adjusted, so that the gamma values of the first gray scale and the second gray scale after adjustment are both close to or equal to the preset reference gamma value. If the first gamma difference value is greater than the preset gamma threshold and the second gamma difference value is not greater than the preset gamma threshold, the gray scale voltage of the first gray scale is adjusted so that the gamma value of the first gray scale is close to or equal to the preset gamma threshold. If the first gamma difference value is not greater than the preset gamma threshold, and the second gamma difference value is greater than the preset gamma threshold, the gray scale voltage of the second gray scale is adjusted, so that the gamma value of the second gray scale is close to or equal to the preset reference gamma value. Therefore, the gamma value of each gray scale is close to each other and the difference with the reference gamma value is relatively small, and thus the chromatic aberration of each gray scale is improved. The preset reference gamma value may be set as needed, such as 2.1, 2.2, or 2.3, etc.

Figure 14:
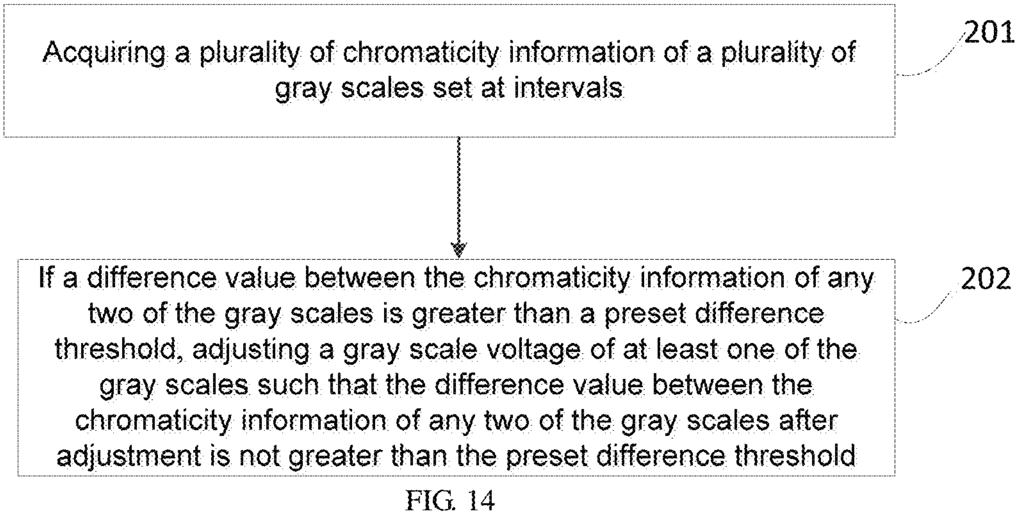
FIG. 14 is a schematic flowchart of a second setting method of a display panel provided in an embodiment of the present disclosure.

A setting method of a display panel is further provided in an embodiment of the present disclosure. Please refer to FIG. 14 for details, FIG. 14 is a schematic flowchart of a second setting method of a display panel provided in an embodiment of the present disclosure. The setting method of the display panel may further comprise:

201, acquiring a plurality of chromaticity information of a plurality of gray scales set at intervals;

202, if the difference value between the chromaticity information of either two gray scales is greater than the preset difference threshold, the gray scale voltage of at least one gray scale is adjusted so that the difference value between the chromaticity information of either two gray scales after adjustment is not greater than the preset difference threshold.

The chromaticity information of each gray scale of a plurality of gray scales is acquired, therefore a plurality of chromaticity information corresponding to a plurality of gray scales are acquired. If the difference value between the chromaticity information of either two gray scales is greater than the preset difference threshold, it means that the chromaticity information between gray scales is relatively huge, and thus the gray scale voltage of at least one gray scale is adjusted so that the difference value between the chromaticity information of either two gray scale after adjustment is not greater than the preset difference threshold. For example, the chromaticity information of each gray scale is adjusted towards a preset chromaticity value, and the preset chromaticity value may be set in advance, such that the chromaticity information of each gray scale is relatively close to each other. In another example, the difference value is adjusted to greater than the gray scale voltage of the gray scale corresponding to the preset difference threshold, therefore the chromaticity information of each gray scale is close to each other.

It can be understood that, the specific steps of adjusting gray scale voltages of the present embodiment may refer to the steps of adjusting gray scale voltages of any one embodiment above, which will not be repeated here.

Figure 15:
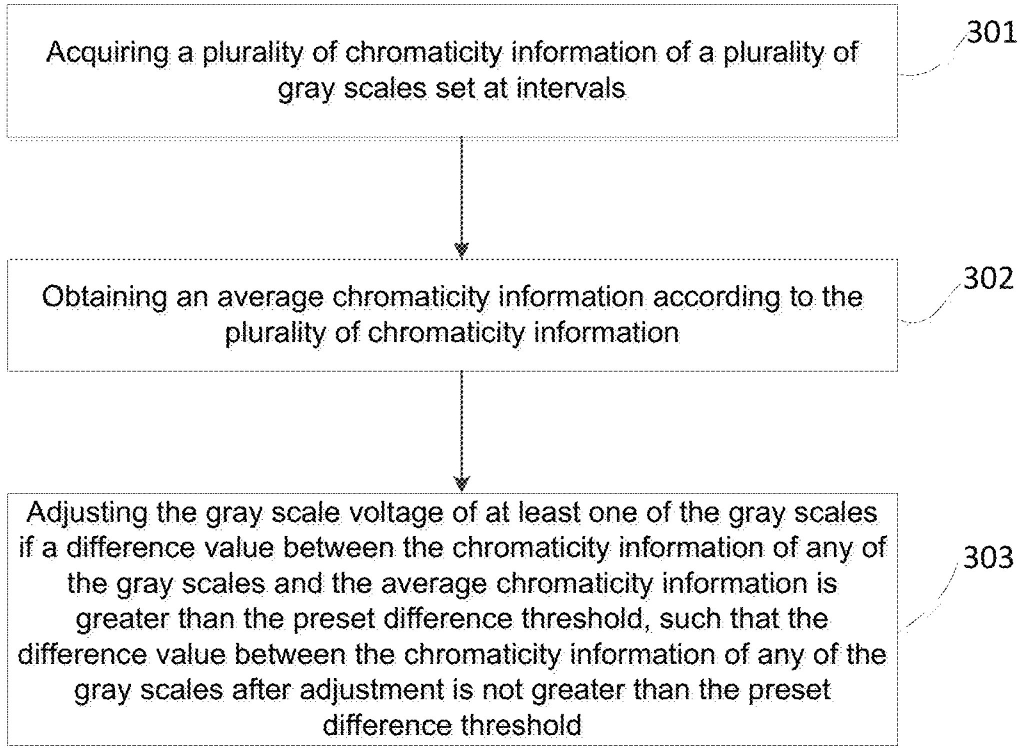
FIG. 15 is a schematic flowchart of a third setting method of a display panel provided in an embodiment of the present disclosure.

A setting method of a display panel is further provided in an embodiment of the present disclosure. Please refer to FIG. 15 for details, FIG. 15 is a schematic flowchart of a third setting method of a display panel provided in an embodiment of the present disclosure. The setting method of the display panel may further comprise:

301, acquiring a plurality of chromaticity information of a plurality of gray scales set at intervals;

302, acquiring an average chromaticity information according to the plurality of chromaticity information;

303, if the difference value between the chromaticity information of any one gray scale and the average chromaticity information is greater than the preset difference threshold, the gray scale voltage of at least one gray scale is adjusted so that the difference value between the chromaticity information of any one gray scale and the average chromaticity information is not greater than the preset difference threshold.

The chromaticity information of each gray scale of the plurality of gray scales is acquired, such that a plurality of chromaticity information corresponding to a plurality of gray scales are acquired. The average of the plurality of chromaticity information is calculated to get the average chromaticity information. If the difference value between the chromaticity information of any one gray scale and the average chromaticity information is greater than the preset difference threshold, which means the chromatic aberration between gray scales is relatively large, then the difference value with the average chromaticity information is adjusted to be greater than the gray scale voltage of the gray scale corresponding to the preset difference threshold, so that the difference value between the chromaticity information of any one gray scale after adjustment and the average chromaticity information is not greater than the preset difference threshold, thereby the chromaticity information of each gray scale is close to each other.

It can be understood that, the specific steps of adjusting gray scale voltages in the present embodiment may refer to the steps of adjusting gray scale voltages in any one embodiment above, which is not repeated herein.

It should be noted that, adjusting gray scale voltage may be considered as adjusting the corresponding RGB voltages to the same value.

The gray scales for which the chromaticity information is acquired are all set with bonding points, the adjusted gray scale voltage may be considered as the adjusted bonding point voltage. The gray scale of the adjusted gray scale voltage may be the 0th, 1st, 31st, 127th, 223rd, 254th, 255th gray scales, or may be the 0th, 1st, 31st, 63rd, 127th, 191st, 223rd, 254th, 255th gray scales. For example, an integrated circuit may be used to generate the gamma voltage, that is, the gray scale voltage, and send the generated gamma voltage to the source driver to realize the nonlinear correction of the gray scale voltage of each gray scale of the display panel. The 7 groups of gamma voltages generated by the integrated circuit can be correspondingly connected to the 7 gray scale binding point voltages on the source driver. It should be noted that the binding points can be set according to needs, such as 10, 14, 16 binding points, etc., and the integrated circuit can also generate 10 or 14 groups of gamma voltages as required.

Figure 16:
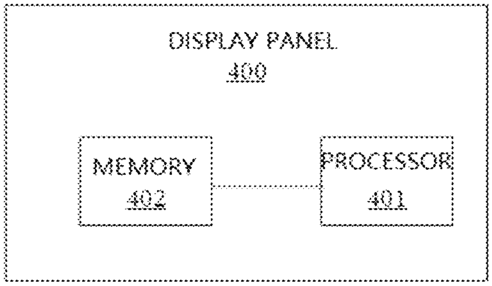
FIG. 16 is a schematic structural diagram of a display panel provided in an embodiment of the present disclosure.

A display panel is further provided in an embodiment of the present disclosure. Please refer to FIG. 16 for details, FIG. 16 is a schematic structural diagram of a display panel provided in an embodiment of the present disclosure. The display panel 400 comprises a memory 402 and a processor 401. The processor 401 is configured to execute the setting method of the display panel in any of the above embodiments by calling a computer program stored in the memory 402, which will not be repeated here.

The embodiment of the present disclosure also provides a storage medium storing a computer program, and when the computer program runs on a computer, the computer executes the setting method of the display panel in any of the above embodiments, for example: acquiring the first chromaticity information of the first gray scale and the second chromaticity information of the second gray scale, wherein the first gray scale and the second gray scale are set at intervals; acquiring the first difference value between the first chromaticity information and the second chromaticity information; and adjusting the gray scale voltages of the first gray scale and/or the second gray scale when the first difference value is greater than the preset difference threshold to adjust the first chromaticity information and/or the second chromaticity information, wherein the second difference value between the first chromaticity information and the second chromaticity information after adjustment is less than the first difference value.

In an embodiment of the present disclosure, the storage medium may be a magnetic disk, an optical disk, a read only memory (ROM), or a random access memory (RAM), etc.

In the above mentioned embodiments, the description of each embodiment has its own emphasis. For parts that are not described in details in an embodiment, reference may be made to related descriptions of other embodiments.

The setting method of the display panel and the display panel provided in the embodiments of the present disclosure are described in detail above. Specific examples are used in this article to explain the principles and implementation of the present disclosure. The description of the above embodiments is only used to help understand the method of the present disclosure and its core ideas. Meanwhile, for those skilled in the art, according to the ideas of the present disclosure, there will be changes in the specific implementation and scope of the present disclosure. In summary, the content of this specification should not be construed as a limits to the present disclosure.

What is claimed is:

1. A setting method of a display panel, comprising:

acquiring a first chromaticity information of a first gray scale and a second chromaticity information of a second gray scale, and the first gray scale and the second gray scale are any two gray scales that are different and set at intervals;

acquiring a first difference value between the first chromaticity information and the second chromaticity information; and adjusting gray scale voltage of at least one of the first gray scale or the second gray scale when the first difference value is greater than a preset difference threshold, to adjust a corresponding chromaticity information of the at least one of the first gray scale or the second gray scale, wherein a second difference value between the first chromaticity information and the second chromaticity information after adjustment is less than the first difference value.

2. The setting method of the display panel of claim 1, wherein brightness of the first gray scale is lower than brightness of the second gray scale.

3. The setting method of the display panel of claim 2, wherein adjusting the gray scale voltage of the at least one of the first gray scale or the second gray scale comprises:

when the first chromaticity information is greater than the second chromaticity information, reducing the gray scale voltage of the first gray scale to reduce the first chromaticity information.

4. The setting method of the display panel of claim 2, wherein adjusting the gray scale voltage of the at least one of the first gray scale or the second gray scale comprises:

when the first chromaticity information is less than the second chromaticity information, increasing the gray scale voltage of the first gray scale to increase the first chromaticity information.

5. The setting method of the display panel of claim 1, wherein adjusting the gray scale voltage of the at least one of the first gray scale or the second gray scale comprises:

adjusting gray scale voltages of gray scales adjacent to the first gray scale simultaneously if the gray scale voltage of the first gray scale is adjusted; and adjusting gray scale voltages of gray scales adjacent to the second gray scale simultaneously if the gray scale voltage of the second gray scale is adjusted.

6. The setting method of the display panel of claim 1, wherein adjusting the gray scale voltage of the at least one of the first gray scale or the second gray scale comprises:

adjusting gray scale voltages of gray scales between the first gray scale and the second gray scale simultaneously if the gray scale voltages of the first gray scale and the second gray scale are adjusted.

7. The setting method of the display panel of claim 1, wherein adjusting the gray scale voltage of the at least one of the first gray scale or the second gray scale comprises:

acquiring a first gamma value of the first gray scale and a second gamma value of the second gray scale;

acquiring a first gamma difference value between the first gamma value and a preset reference gamma value and a second gamma difference value between the second gamma value and the preset reference gamma value;

adjusting gray scale voltages of the first gray scale and the second gray scale if the first gamma difference value is greater than the preset gamma threshold and the second gamma difference value is greater than the preset gamma threshold;

adjusting the gray scale voltage of the first gray scale if the first gamma difference value is greater the preset gamma threshold and the second gamma difference value is not greater than the preset gamma threshold; and adjusting the gray scale voltage of the second gray scale if the first gamma difference value is not greater than the preset gamma threshold and the second gamma difference value is greater than the preset gamma threshold.

8. A setting method of a display panel, comprising:

acquiring a plurality of chromaticity information of a plurality of gray scales that are any different gray scales set at intervals; and if a difference value between the chromaticity information of any two of the gray scales is greater than a preset difference threshold, adjusting a gray scale voltage of at least one of the gray scales such that the difference value between the chromaticity information of any two of the gray scales after adjustment is not greater than the preset difference threshold.

9. The setting method of the display panel of claim 8, wherein adjusting the gray scale voltage of at least one of the gray scales such that the difference value between the chromaticity information of any two of the gray scales after adjustment is not greater than the preset difference threshold comprises:

adjusting a gray scale voltage of a lower gray scale in the two gray scales between which the difference value of the chromaticity information is greater than the preset difference threshold, such that the difference value between the chromaticity information of the two gray scales after adjustment is not greater than the preset difference threshold.

10. The setting method of the display panel of claim 8, wherein the method further comprises:

acquiring the plurality of chromaticity information of the plurality of gray scales set at intervals;

obtaining an average chromaticity information according to the plurality of chromaticity information; and adjusting the gray scale voltage of at least one of the gray scales if a difference value between the chromaticity information of any of the gray scales and the average chromaticity information is greater than the preset difference threshold, such that the difference value between the chromaticity information of any of the gray scales after adjustment is not greater than the preset difference threshold.

11. A display panel, comprising a memory and a processor, wherein through calling computer programs stored in the memory, the processor is configured to:

acquire a first chromaticity information of a first gray scale and a second chromaticity information of a second gray scale, and the first gray scale and the second gray scale are any two gray scales that are different and set at intervals;

acquire a first difference value between the first chromaticity information and the second chromaticity information; and adjust gray scale voltage of at least one of the first gray scale or the second gray scale when the first difference value is greater than a preset difference threshold, to adjust a corresponding chromaticity information of the at least one of the first gray scale or the second gray scale, wherein a second difference value between the first chromaticity information and the second chromaticity information after adjustment is less than the first difference value.

12. The display panel of claim 11, wherein brightness of the first gray scale is lower than brightness of the second gray scale.

13. The display panel of claim 12, wherein adjusting the gray scale voltage of the at least one of the first gray scale or the second gray scale comprises:

when the first chromaticity information is less than the second chromaticity information, increasing the gray scale voltage of the first gray scale to increase the first chromaticity information.

14. The display panel of claim 12, wherein adjusting the gray scale voltage of the at least one of the first gray scale or the second gray scale comprises:

when the first chromaticity information is greater than the second chromaticity information, reducing the gray scale voltage of the first gray scale to reduce the first chromaticity information.

15. The display panel of claim 11, wherein adjusting the gray scale voltage of the at least one of the first gray scale or the second gray scale comprises:

adjusting gray scale voltages of gray scales adjacent to the first gray scale simultaneously if the gray scale voltage of the first gray scale is adjusted; and adjusting gray scale voltages of gray scales adjacent to the second gray scale simultaneously if the gray scale voltage of the second gray scale is adjusted.

16. The display panel of claim 11, wherein adjusting the gray scale voltage of the at least one of the first gray scale or the second gray scale comprises:

adjusting gray scale voltages of gray scales between the first gray scale and the second gray scale simultaneously if the gray scale voltages of the first gray scale and the second gray scale are adjusted.

17. The display panel of claim 11, wherein adjusting the gray scale voltage of the at least one of the first gray scale or the second gray scale comprises:

acquiring a first gamma value of the first gray scale and a second gamma value of the second gray scale;

acquiring a first gamma difference value between the first gamma value and a preset reference gamma value and a second gamma difference value between the second gamma value and the preset reference gamma value;

adjusting gray scale voltages of the first gray scale and the second gray scale if the first gamma difference value is greater than the preset gamma threshold and the second gamma difference value is greater than the preset gamma threshold;

adjusting the gray scale voltage of the first gray scale if the first gamma difference value is greater the preset gamma threshold and the second gamma difference value is not greater than the preset gamma threshold; and adjusting the gray scale voltage of the second gray scale if the first gamma difference value is not greater than the preset gamma threshold and the second gamma difference value is greater than the preset gamma threshold.

18. The display panel of claim 11, wherein the processor is further configured to:

acquire a plurality of chromaticity information of a plurality of gray scales set at intervals; and if a difference value between the chromaticity information of any two of the gray scales is greater than the preset difference threshold, adjust the gray scale voltage of at least one of the gray scales such that the difference value between the chromaticity information of any two of the gray scales after adjustment is not greater than the preset difference threshold.

19. The display panel of claim 18, wherein the processor is further configured to adjust a gray scale voltage of a lower gray scale in the two gray scales between which the difference value of the chromaticity information is greater than the preset difference threshold, such that the difference value between the chromaticity information of the two gray scales after adjustment is not greater than the preset difference threshold.

20. The display panel of claim 11, wherein the processor is further configured to:

acquire a plurality of chromaticity information of a plurality of gray scales set at intervals;

obtain an average chromaticity information according to the plurality of chromaticity information; and adjust the gray scale voltage of at least one of the gray scales if a difference value of the chromaticity information of any of the gray scales and the average chromaticity information is greater than the preset difference threshold, such that the difference value between the chromaticity information of any of the gray scales after adjustment is not greater than the preset difference threshold.

* * * * *